3,078,678
FLUID PRESSURE INTENSIFYING UNIT
Eugene F. Beatty, South Bend, Ind., assignor to The Bendix Corporation, South Bend, Ind., a corporation of Delaware
Filed Nov. 13, 1961, Ser. No. 151,705
4 Claims. (Cl. 60—54.6)

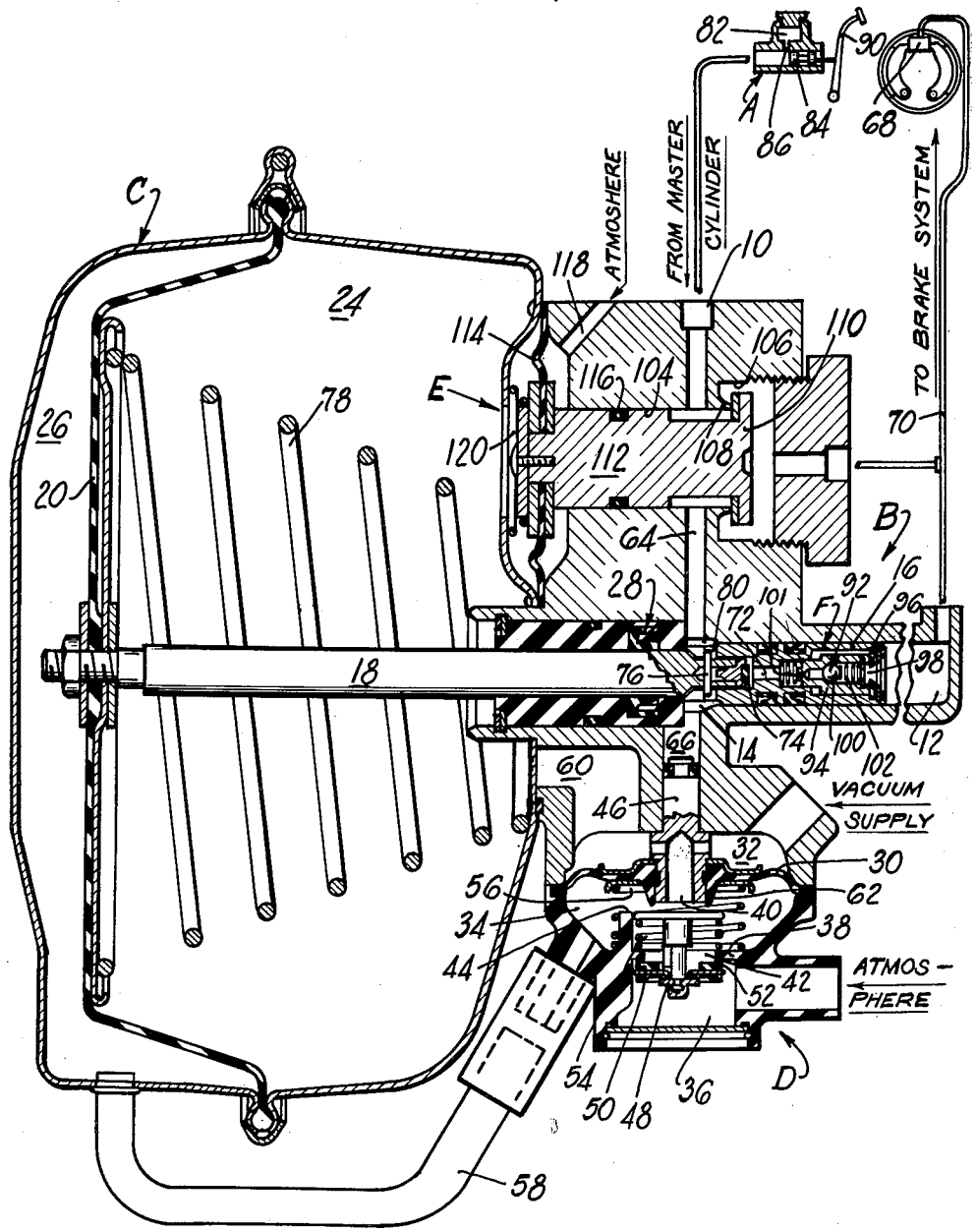

The present invention relates to power braking systems and the like of the type wherein pressure from a master cylinder is intensified in a servomotor driven fluid pressure intensifying unit which in turn actuates the brake applying wheel cylinders of the automotive vehicle.

In the fluid pressure systems of the above mentioned type, the hydraulic piston in the fluid pressure intensifying unit divides a chamber into an output section connected to the wheel cylinders of the automotive braking system, and an input section which is connected to the master cylinder of the automotive braking system. A suitably hydraulically actuated control valve for the servomotor is also provided which receives pressure from the master cylinder that is connected to the input chamber so that the servomotor is actuated in accordance with the pressure received from the master cylinder. The hydraulic piston of the fluid pressure intensifying unit is actuated by means of a push rod which extends through the input chamber and is suitably connected to the servomotor. In some instances, this push rod is sized large enough so that the displacement of the input chamber is only a fraction of that of the output chamber. This permits the intensifying unit to be actuated by means of a master cylinder having a fluid displacement which is only a fraction of that which would be required if the master cylinder were designed to actuate the wheel cylinders directly. Intensifying units of the above described type usually also provide a small compensating or bleed passage in the hydraulic piston for communicating fluid from the follow-up chamber to the output chamber to allow fluid to enter the output chamber and make up for volumetric changes due to thermal expansion, or to replace fluid lost by leakage. Suitable valve means is provided in this compensating passage so that the passage will be closed off whenever the hydraulic piston is moved out of its normal retracted position. Compensating fluid is in turn supplied to the follow-up chamber from the reservoir of the master cylinder through a suitable valving arrangement which is only open when the master cylinder is in its retracted or unactuated position.

In systems of the above described type, the compensating passage which is provided in the hydraulic piston of the fluid pressure intensifying unit is purposely made of a very small size so as to provide a considerable restriction for fluid flow from the follow-up chamber to the output chamber. This high restriction is usually necessary in order to assure that the valving structure for the servomotor will be actuated promptly upon actuation of the master cylinder without losing a considerable volume of the master cylinder's fluid to the output chamber. The small size of this flow restriction makes pressure bleeding of the hydraulic braking system from the master cylinders through the fluid pressure intensifying unit exceedingly difficult. The flow restriction in the compensating passage further makes a manual application of the vehicle brakes during failure of the fluid pressure intensifying unit exceedingly difficult since the manually developed pressure from the master cylinder must at this time be forced through the flow restriction leading to the output chamber of the intensifying unit.

Accordingly, an object of the present invention is the provision of a new and improved fluid pressure intensifying unit of the above described type having means therein for by-passing the flow restricting compensating passage between the follow-up and the output chambers during those times when the braking system must be actuated manually.

A further object of the present invention is the provision of a new and improved fluid pressure intensifying system which includes a second compensating connection of large flow capacity which generally parallels the prior art fluid compensating connection in the hydraulic piston, and which valve structure includes a poppet that is biased shut by the output pressure of the intensifying unit; and further includes an actuating diaphragm, one surface of which communicates with the vacuum suspended chamber of the servomotor, and the other surface of which communicates with the atmosphere so that the poppet member is biased closed when power is available to operate the servomotor, and is open when vacuum no longer exists in the servomotor to actuate the same.

The invention resides in certain constructions and combinations and arrangements of parts; and further objects and advantages of the invention will become apparent to those skilled in the art to which it relates from the following description of the preferred embodiment described with reference to the accompanying drawing forming a part of this specification, and in which:

The solitary FIGURE of the drawing is a longitudinal cross sectional view of a fluid pressure intensifying unit embodying principles of the present invention, and in which the cooperating portions of the automotive braking system are shown schematically.

The fluid pressure intensifying unit shown in the drawing has a hydraulic pressure inlet 10 to which is communicated the pressure signal from a conventional master cylinder A, and the unit intensifies this signal in its hydraulic pressure intensifying cylinder B. The hydraulic pressure intensifying cylinder B is divided into an output, or hydraulic pressurizing chamber 12, and a follow-up chamber 14 by means of a hydraulic piston 16. The hydraulic piston 16 is adapted to be driven down the intensifying cylinder B by means of the piston rod 18—which in turn is driven by a power piston or diaphragm 20 of the servomotor C. The power diaphragm 20 divides the internal chamber of the servomotor into a forward power chamber 24 to which vacuum is always communicated as will later be explained, and a rear power chamber 26 to which vacuum is normally communicated and to which atmospheric pressure is modulated to actuate the unit. A suitable sealing structure 28 is provided around the piston rod 18 to seal off the end of the hydraulic pressure intensifying chamber; and for a more complete description of its construction, reference may be had to the Maxwell L. Cripe application Serial No. 109,555.

Control of the servomotor unit C is had by means of the control valve structure D which as previously indicated normally communicates vacuum to the rear power chamber 26, and which communicates atmospheric pressure thereto when it actuates the motor. The control valve D has a movable diaphragm 30 which separates the valve's vacuum chamber 32, to which vacuum is always communicated, from the valve's control chamber 34. The control valve D further contains an atmospheric chamber 36 spaced on the opposite side of the control chamber 34 from the diaphragm 30; and atmospheric chamber 36 is separated from the control chamber 34 by means of a rigid partition member 38. Aligned atmospheric and vacuum ports 42 and 40 are provided in the diaphragm 30 and partition 38, respectively. The vacuum port 40 is formed by means of a tubular end portion 44 of the valve's hydraulic actuating piston 46. Suitable passageways are provided in the tubular end portion 44 to communicate vacuum from the chamber 32 to the control chamber 34. The vacuum and atmospheric ports 40 and 42 are adapted to be closed off by means of spool shaped poppet member 48 which extends through the atmospheric port 42 and has suitable flange portions 50 and 52 for abutment with the outer surfaces of the partition member 38 and the tubular end portion 44 of its hydraulic actuating piston 46, respectively. A spring 54 normally biases the flange 52 against the atmospheric valve seat surrounding the port 42 and a spring 56 normally biases the suitably stiffened center portion of the diaphragm 30 out of engagement with the flange 50 to communicate vacuum to the rear power chamber 26 through conduit 58. Vacuum from the chamber 32 is also continually communicated to the opposing power chamber 24 through passageway 60. The diaphragm 30 includes an annular boss 62 which surrounds the tubular portion 44 to make a vacuum tight seal with respect to the flange 50; and for a more complete understanding of the construction and operation of the control valve so far described, reference may be had to the Maxwell L. Cripe application Serial No. 59,914.

Actuation of the control valve D is produced by means of the hydraulic signal which is received from the master cylinder A through the inlet 10 and which is communicated through passageway 64 to the valve's hydraulic actuating chamber 66. Passageway 64 is always open so that the control valve D is made directly responsive to the pressure signal produced in the master cylinder A.

The output chamber 12 is of course connected to the brake actuating wheel cylinders 68, only one of which is shown, by means of the hydraulic actuating line 70. Because contraction of the hydraulic fluid during times of cooling can create vacuum in the wheel cylinders 68, it is necessary to provide a compensating passage 72 to allow additional fluid to pass the hydraulic piston 16 in its normal retracted position. As is conventional in intensifying units of the type shown in the drawing, the hydraulic piston 16 is provided with a compensating passage 72 which includes a two-way back pressure valve F, and through which it communicates the output chamber 12 with the follow-up chamber 14. The compensating passage 72 is closed off during actuation of the servomotor by a poppet member 74 attached to the end of the push rod 18. The push rod 18 is loosely pinned to the hydraulic piston 16, as by means of pin 76 which extends into a slotted opening to the piston 16, to provide for the necessary poppet movement. Once the diaphragm 20 is actuated, poppet 74 closes off the compensating port 72, and the push rod 18 thereafter forces the piston 16 down the chamber B. The push rod 18 is of course normally biased to its retracted position shown in the drawing by the power piston return spring 78; and in this position, the outer end of the piston 16 abuts the inner end of the sealing structure 28 and the poppet 74 is held off of its seat. Rearward movement of the piston rod 18 is limited by the pin 76 abutting the rearward end of the slotted hole 80 in the piston 16. The conventional master cylinders A which are intended to be used in conjunction with the fluid pressure intensifying unit shown in the drawing are provided with a reservoir of make-up fluid 82 which is communicated to its outlet in the normal retracted position of its piston 84 by means of a compensating port 86. In the normal retracted positions of the pistons 16 and 84, therefore, fluid communication is provided from the reservoir 82 to the wheel cylinders 68.

In the fluid pressure intensifying unit shown in the drawing, the piston rod 18 is of quite large size so that the displacement of the follow-up chamber 14 is only a fraction of that of its output chamber 12. During normal operation, therefore, the master cylinder A need only provide a small fraction (generally less than half) of the displacement of the driven wheel cylinders 68. The trade conventionally calls such units, low input units.

An advantage is obtained by making the displacement of the master cylinder as small as possible so that either the stroke of its actuating lever 90 may be made to approach that of the usual accelerator pedal for automobiles, or the pressure which can be developed manually will be as large as possible for trucks. Where this is done, however, it is essential to assure that none of the fluid displaced from the master cylinder A passes through the compensating connection 72 prior to the time that the control valve D is actuated and the poppet 74 closes off the compensating passage 72. If this were not done, foot pedal lever 90 would be bottomed on the floor board of the vehicle before the brakes were properly applied. This is prevented in the type of low input unit shown in the drawing, by providing a two-way check valve structure 92 in the compensating passage 72 to provide a back pressure which prevents passage of fluid from the input connection to the output chamber 12 before the servomotor C forces the poppet member 74 into engagement with the piston 16. The two-way check valve 92 shown in the drawing comprises an annular sleeve 94—the output end of which is normally biased up against a suitable valve seat 96. The center passage 98 through the annular sleeve 94 is provided with a ball check 100 that is normally biased against its seat to prevent flow through the center passage 98. Center passage 98 is further provided with a flow restriction 101 to limit fluid flow produced by a slam actuation of the master cylinder A from unseating the ball check 100 and flowing to the output chamber 12 before the servomotor closes the compensating port 72. Annular sleeve 94 is biased against its seat 96 by means of a light coil spring 102 so that large return flows are permitted from the output chamber 12 to the follow-up chamber 14 around the outside of the annular sleeve 94.

It will be seen that the two-way check valve 92 provides such a high degree of flow restriction from the follow-up chamber 14 to the output chamber 12, that considerable difficulty is involved in completely filling the system with hydraulic fluid. It will further be seen that the two-way check valve 92, which is necessary in a low input system, creates such a high degree of flow restriction that it retards a manual application of the system when all fluid from the master cylinder must pass through the compensating passage 72. According to principles of the present invention therefore, a valving structure E is provided which will open communication from the master cylinder A directly to the actuating line 70 when no power is available to actuate the servomotor C. This also permits the hydraulic system to be easily filled with fluid initially; and further permits the braking system to be actuated manually without forcing fluid through the flow restricting back pressure valve F.

The valving structure E shown in the drawing generally comprises a transverse bore 104 in the casting of the intesifying unit which intersects the middle of its hydraulic inlet passageway 64. The outer end of the transverse bore 104 communicates with the hydraulic actuating line 70 and is suitably enlarged as at 106 to provide a valve seating shoulder 108 against which a valve closure member 110 abuts to close off communication between the inlet connection 10 and the actuating line 70. Inasmuch as the valve seat 106 faces in the direction of flow to the output chamber, high output pressures from the output chamber 12 of the intensifying unit forces the valve closure member 110 against its seat and prevents any return flow to the master cylinder A. The valve closure member 110 includes a stem portion 112 which extends through the transverse bore 104 and projects into the vacuum chamber 24 of the servomotor C. The valve closure member 110 is caused to be seated against the shoulder 108 whenever vacuum is available to actuate the servomotor by means of a power diaphragm 114—the center portion of which is suitably fastened to the stem portion 112, and the outer periphery of which is sealingly clamped between the shell of the servomotor C and the casting of the intensifying chamber B. The stem portion 112 is given a size substantially equal to that of the valve seat 108 so that hydraulic pressure from the master cylinder does not tend to unseat the closure member 110 from its valve seat 108. A suitable seal 116 is provided between the stem portion 112 and bore 104; and atmospheric pressure is communicated to beneath the diaphragm 114 by means of passageway 118 so that an atmospheric to vacuum pressure differential is used to seat the valve closure member 110 whenever vacuum exists in the servomotor C. The opposite face of the diaphragm 114 is, of course, exposed to the vacuum in the vacuum chamber 24 of the servomotor C, and a light spring 120 is provided to unseat the valve closure member 110 whenever atmospheric pressure exists in the vacuum chamber 24 of the servomotor C.

During a vacuum failure to the servomotor C, the spring 120 opens the valve closure member 110 to permit direct communication to the master cylinder A to the hydraulic actuating line 70. During vacuum failure, therefore, fluid displaced from the master cylinder can proceed directly through the transverse bore 104 without experiencing any appreciable restriction. When vacuum is available to actuate the servomotor C, the diaphragm 114 is biased to the left to close the transverse bore 104 and prevent direct communication of the master cylinder A to the wheel cylinders 68. Since the valve structure used is essentially hydraulically balanced, pressure from the master cylinder A will not unseat the valve closure member 110. The initial displacement from the master cylinder A therefore proceeds to the control valve structure D to bring the servomotor C into operation and thereby close off compensating passage 72 before any appreciable displacement from the master cylinder A has passed through the restriction 101. The diaphragm 114 is sized to normally overpower the valve opening spring 120 and hold the valve closure member 110 against its seat; and once pressure has been developed in the output chamber 12 of the intensifying unit, the valve closure member 110 is positively biased against its seat so that no leakage in either direction can occur.

It will be apparent that the objects heretofore enumerated as well as others have been accomplished; and that there has been provided a suitable valving arrangement for a low input type of fluid pressure intensifying unit which will permit the hydraulic braking system to be easily filled with fluid initially; and which will permit the master cylinder A to operate the wheel cylinders directly without either moving the hydraulic piston 16, or without experiencing unnecessary back pressure through its compensating passage 72.

While the invention has been described in considerable detail, I do not wish to be limited to the particular embodiment shown and described; and it is my intention to cover hereby all novel adaptations, modifications and arrangements thereof which come within the practice of those skilled in the art to which the invention relates.

I claim:

1. A hydraulic fluid pressure intensifying unit comprising: a housing having a hydraulic fluid displacement chamber therein; a first movable wall dividing said chamber into an output chamber and an opposing follow-up chamber; means providing a fluid compensating flow restriction between said follow-up chamber and said output chamber; said housing having a hydraulic inlet communicating with said follow-up chamber, and a hydraulic outlet communicating with said output chamber; a servomotor controlled by the hydraulic pressure supplied said inlet for causing said movable wall to displace fluid from said output chamber, said servomotor having a connection to a power supply for actuating said servomotor; a valving structure for communicating fluid flow directly from said inlet to said outlet, said valving structure including a valve seat facing in the direction of flow to said outlet; a poppet member for positive sealing engagement with said valve seat; and means closing said poppet member against said seat when power is available at said power connection to actuate said servomotor.

2. A hydraulic fluid pressure intensifying unit comprising: a housing having a hydraulic fluid displacement chamber therein; a first movable wall dividing said chamber into an output chamber and an opposing follow-up chamber; means providing a fluid compensating flow restriction between said follow-up chamber and said output chamber; said housing having a hydraulic inlet communicating with said follow-up chamber, and a hydraulic outlet communicating with said output chamber; a servomotor controlled by the hydraulic pressure supplied said inlet for causing said movable wall to displace fluid from said output chamber, said servomotor having a connection to a power supply for actuating said servomotor; a cylinder bore having an inlet in the sidewalls of said bore communicating with said hydraulic inlet, said bore being enlarged on one side of said inlet to provide a valve seat, said enlarged portion communicating with said hydraulic outlet; a piston member in said bore having a flange portion for abutment with said valve seat, a fluid pressure seal positioned between said bore and said piston member on the opposite side of said inlet from said valve seat, and means actuated by the power supply to said power connection for biasing said flange against said valve seat when power is available and for opening said flange from said valve seat when power is not available.

3. A hydraulic fluid pressure intensifying unit comprising: a housing having a hydraulic fluid displacement chamber therein; a first movable wall dividing said chamber into an output chamber and an opposing follow-up chamber; means providing a fluid compensating flow restriction between said follow-up chamber and said output chamber; said housing having a hydraulic inlet communicating with said follow-up chamber, and a hydraulic outlet communicating with said output chamber; a fluid pressure servomotor having a power chamber positioned on the side of said follow-up chamber opposite of said movable wall, a movable wall in said power chamber forming a low pressure opposing chamber adjacent said follow-up chamber into which a low pressure is normally communicated, and another opposing chamber into which a high pressure is communicated to actuate said movable walls and displace fluid out of said outlet, a valving structure in said inlet for communicating fluid flow directly to said outlet, said valving structure including a valve seat facing in the direction of flow to said outlet; a poppet member for positive sealing engagement with said valve seat; a diaphragm connected to said poppet member, one side of said diaphragm being normally communicated to said low pressure and the opposite side of said diaphragm being communicated to said high pressure to hold said poppet member against said valve seat, and means causing said poppet to move out of engagement with said seat when said high pressure is communicated to said one side of said diaphragm.

4. A hydraulic fluid pressure intensifying unit comprising: a housing having a hydraulic fluid displacement chamber therein; a first movable wall dividing said chamber into an output chamber and an opposing follow-up chamber; means providing a fluid compensating flow restriction between said follow-up chamber and said output chamber; said housing having a hydraulic inlet communicating with said follow-up chamber, and a hydraulic outlet communicating with said output chamber; a fluid pressure servomotor having a power chamber positioned on the side of said follow-up chamber opposite of said movable wall; a movable wall in said power chamber forming an opposing vacuum chamber adjacent said follow-up chamber into which a vacuum is normally communicated, and another opposing chamber into which atmospheric pressure is communicated to actuate said movable walls and displace fluid out of said outlet; a cylinder bore having an inlet in the sidewalls of said bore communicating with said hydraulic inlet, said bore being enlarged on one side of said inlet to provide a valve seat, said enlarged portion communicating with said hydraulic outlet; a piston member in said bore having a flange portion for abutment with said valve seat, a fluid pressure seal positioned between said bore and said piston member on the opposite side of said inlet from said valve seat, a diaphragm connected to said poppet member, one side of said diaphragm being communicated to said vacuum and the opposite side of said diaphragm being communicated to atmospheric pressure to hold said poppet member against said valve seat, and means causing said poppet to move out of engagement with said seat when said atmospheric pressure is communicated to said one side of said diaphragm.

No references cited.